April 13, 1937.   R. P. PIPEROUX   2,076,589
MULTICOLOR PRINTING ON ARTICLES OF IRREGULAR SHAPE
Filed Feb. 11, 1932
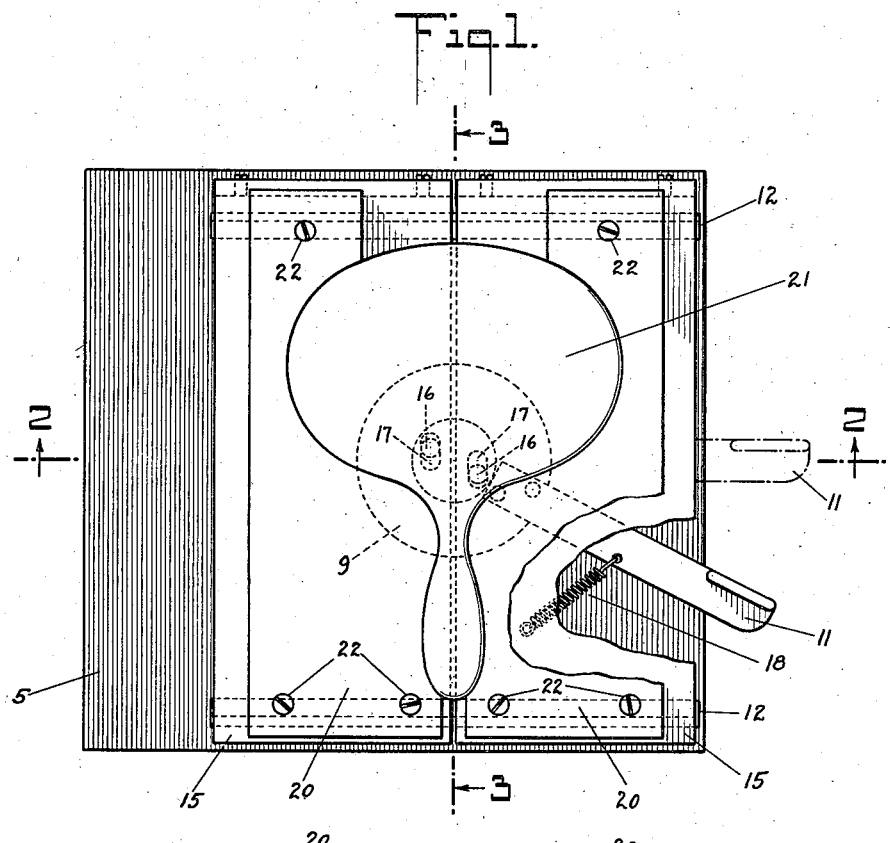
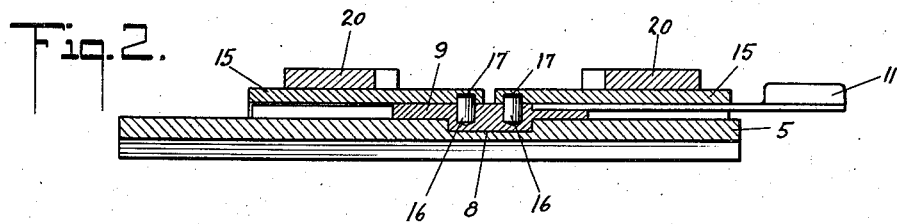
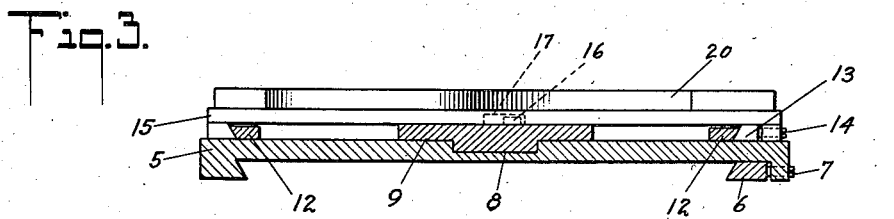
INVENTOR
RENE P. PIPEROUX
BY
ATTORNEYS Patented Apr. 13, 1937

2,076,589

UNITED STATES PATENT OFFICE 2,076,589

MULTICOLOR PRINTING ON ARTICLES OF IRREGULAR SHAPE

Rene P. Piperoux, Radburn, N. J., assignor to Celluloid Corporation, a corporation of New Jersey Application February 11, 1932, Serial No. 592,228

2 Claims. (Cl. 101—211)

This invention relates to the method and apparatus for decorating celluloid toiletware and articles of like nature and more particularly to the registration of such irregular shaped articles for multicolor printing on the same.

The method of decorating articles, as commonly practiced, consists in first forming a die similar to that which is used in printing but usually made up of brass. This die, which has in relief the design which it is desired to print, is secured to the upper platen, or presser plate, of a parallel jaw press and is heated by any suitable means, such as electrical means. The upper platen carrying the heated die is adapted to be vertically reciprocated by means of a hand lever or by any other manually controlled means. Mounted upon the bed of the press is a sliding platen upon which the article to be imprinted is laid.

A sheet of decorating foil of the desired color is superposed on the article. This foil is a sheet of color coated on the back with shellac or size which becomes adhesive under the influence of heat. In imprinting, the sliding platen carrying the article covered with the foil is slid under the heated die which is lowered and pressed upon the article, thus causing the foil to adhere wherever the die has touched it. After the imprinting operation of the foil, being more or less friable, is easily brushed off except where the heat and pressure of the die has caused it to adhere. Instead of the foil above mentioned, the color is sometimes coated on waxed papers and the imprinting done in a manner similar to the above. By a series of successive imprints using differently colored foils and different dies for each color, the article may be decorated in two or more colors.

In order to produce a saleable article decorated in a plurality of colors, it is of the utmost importance to properly locate the dies or the articles in relation to the die. However, makeshift methods have been heretofore used. One of such methods consisted in making a cut out in the form of the item to be imprinted in which the article could be laid. However no two pieces are identical and there is always trouble in the imprinting of celluloid articles due to distortion of the pieces in processing, so that it was necessary to provide a great deal of play in the holding member to permit the admission of pieces of normal variation. Since the several color impressions were made at different times, there was no guarantee that the pieces would occupy identical positions on successive printings. This fault was the cause of a great deal of poor registration, and occasions were numerous where over 25% of the pieces had to be rejected because of such faulty registration.

Moreover, the original setup was always a very tedious operation and was done in the following manner. The die was fastened to the upper platen as described above. The item holder or jig was temporarily laid on the lower platen in the approximate position and a piece imprinted. Based on this first printing, correction was made in the position of the jig to better center the design and a second printing made, so that after a series of trials, the approximate position was eventually arrived at. All the pieces made up to this point were wasted, and such trial setups very often took as long as 30 minutes. On the printing of the second color, a second series of trials had to be made with the second color die and so on with every color. Furthermore, since the jig was always made oversize it was by no means certain that the next dozen pieces coming into the jig would occupy the same position and be similarly imprinted to the sample. It is accordingly an important object of my invention to provide an improved method of and apparatus for applying multicolor designs to celluloid articles which will assure perfect registration under all circumstances, regardless of a tolerable lack of uniformity in the articles and which will reduce the setup time from the 30 minutes mentioned above to less than one minute.

Other objects and advantages of this invention together with certain details of construction and combinations of parts will be more particularly described in the specification and pointed out in the appended claims.

In accordance with my invention, I first form the dies which are made in the following manner. As many pieces of sheet brass of substantially the same size are cut as the number of colors which it is desired to imprint. Each of these pieces of brass is provided with two dowel holes and two spaced pin holes. All of the said holes are drilled from a master jig and are therefore in identical position on each plate. Fixed in the dowel holes are dowels, the purpose of which will be hereinafter set forth.

The design which it is desired to reproduce is engraved on a thin, flexible sheet of material in which sheet two pin holes have similarly been drilled from the master jig. While I prefer to use thin, flexible sheets of pyroxylin or cellulose acetate, it will be understood that sheets of any material capable of being engraved may be used. The exact position of the design in reference to the pin holes is of small importance except that it is usual to approximately center it. The design is drawn in its entirety including all the colors. A roller with printing ink is then rolled over the engraved sheet, and being a flat roller, the ink or grease, which latter may equally well be used, does not penetrate into the crevices of the engraving. Each of the brass plates is then painted over with a mixture of chalk and water. The greased engraved sheet is then laid over this chalk surface, greased face down, using two fine pins in the pin holes to register the drawing with the plate, and then thoroughly rubbed in contact. When this has been done on each of the plates, it is assured that all plates are identical since the pin holes are in register with each other and the engraved sheet is in registration with the same holes. Rubbing this greased surface over the chalk removes the chalk except where the ink has not penetrated into the design and leaves the design standing up in white lines (if white chalk is used) on the surface. To render the design sufficiently permanent so that it can easily be handled the brass plate is then dipped in lacquer which "fixes" the chalk. The entire design is now transferred onto each sheet of brass and the various color dies are obtained by routing off in the usual way the entire design except for the particular color which is required. My process covers only the method of transference of the designs in registration with each other by means of holes drilled from a master jig, but does not cover the routing out of the dies since this feature is old in the art.

The decorating press on which the imprinting is done is altered in the following way. The upper platen is drilled from a master plate with a series of dowels and screw holes. The dowels on the dies are adapted to fit into the dowel holes prepared in the upper platen, the construction and arrangement being such that by using the same series of dowel holes, each of the dies is quickly placed in the proper position with respect to the article to be imprinted.

The lower, or sliding, platen carries an improved chuck or holding device and in the description thereof reference is had to the accompanying drawing wherein Fig. 1 is a plan view of my improved chuck showing a mirror base locked therein;

Fig. 2 is a cross sectional view taken on line 2—2 in Fig. 1; and

Fig. 3 is a cross-sectional view taken on line 3—3 in Fig. 1.

Referring to the drawing, the reference numeral 5 indicates a platen which is mounted on the bed plate of a parallel jaw press and is adapted to slide relative thereto. The platen is maintained in position on the bed plate by means of a gib 6 and screw 7, as is well understood in the art. The platen is provided with a circular recess 8 in which is journaled an actuating disc 9. An operating lever 11 is rigidly secured to the disc in any suitable manner.

Secured to the upper surface of platen 5 are ways strips 12 on which are slidably mounted by means of gib 13 and screw 14 the jaw plates 15. These jaw plates are adapted to be movable toward and from each other and to this end actuating disc is provided with pins 16 which fit into elongated recesses 17 formed in the under side of the jaw plates. With the lever 11 in the position shown in full lines in Fig. 1, the jaws are closed and to open them the operative moves the lever to the position shown in dot-dash lines. A contractile spring 18 fixed to the platen and the lever serves to hold the jaw plates together during the imprinting operation. The construction and arrangement outlined above makes for a chuck of the self-centering type so that the jaw plates always move towards or away from the center line an equal distance. When the jaw plates are closed and the platen slid beneath the die attached to the upper platen, the center line between the jaw plates and the center line of the die are in the same vertical plane. A stop is provided in the back of the press to insure that the sliding platen will always come to this position when the operative pushes the platen to the imprinting position.

The jaw plates are provided with a number of threaded holes to take masks of various contours to hold the variously shaped articles which it is desired to decorate. The mask 20 shown in the drawing is adapted, as shown, to hold a mirror blank 21. The mask is made in two parts, each of said parts being fastened to a jaw plate by means of screws 22.

When the mirror blank is placed flat on the jaw plates and held in the mask and the chuck closed the mirror blank will always be centered in relation to the die and moreover while slight irregularities in its shape will perhaps affect its position in the jaws to a slight extent, it will be in the same position on the second or any number of printings. Furthermore once these masks and dies have been made they can be laid away and at a later date remounted on the press in the exact position which they occupied previously. Since the dies can be equally easily replaced in their original position registration is assured without the making of any trials.

The operation of the apparatus for carrying out the decorating process is as follows: The proper die is fixed to the upper platen and the mask for the article to be decorated is secured to the jaw plates. With the sliding platen in forward position and the chuck open, the article is placed within the confines of the mask and the operating lever is moved to cause the jaw plates to move simultaneously towards a common center thus causing the mask to grip the article securely, but without injury thereto, along its entire periphery and centering the article with respect to the die carrying the design to be transferred to the article. A sheet of coloring material is now superposed on the article and the sliding platen is pushed beneath the die, the platen coming to rest against a stop previously set in the position for perfect alignment between the article and the die. The upper platen with its heated die is then lowered for the imprinting operation. After this operation the die is raised and the sliding platen pulled forward. The surplus coloring material is brushed off. The operating lever is then moved to open the chuck and the article is removed therefrom.

When the batch of articles has received the imprint of the first color, the die is removed and another die substituted therefor and a second imprint with a different color is made upon the article. Another change of die and coloring material is made if a third color is to be imprinted on the article.

It will readily be understood that when an article of different contour is to be decorated, it can be readily accomplished by fixing the proper die to the upper platen and a suitable mask secured to the lower, or sliding platen.

It is to be understood that the foregoing detailed description is given merely by way of illustration and that many variations may be made therein without departing from the spirit of my invention.

Having described my invention, what I desire to secure by Letters Patent is:

1. The method of applying a multicolored design to a batch of articles of substantially the same irregular shape by the use of a separate heated die for each color, which comprises the steps of placing each irregular-shaped article of the batch in succession on a platen, adjusting the position of each article on said platen and gripping it in the said position by causing a plurality of surfaces located around the article to advance simultaneously towards the article, to contact the article at a plurality of points around the irregular periphery thereof, at such predetermined rates relative to each other that they simultaneously reach the desired positions of the portions of the edges of the article with which they contact, printing each article while so positioned, replacing the heated die with another for a different color in exactly the same position, again positioning and printing the succession of articles as before, and continuing the process with further heated dies for further colors as necessary.

2. The method of applying a multicolored design to a batch of articles of substantially the same irregular shape by the use of a separate heated die for each color, which comprises the steps of placing each irregular-shaped article of the batch in succession on a platen, adjusting the position of each article on said platen and gripping it in the said position by causing a plurality of surfaces located around the article to advance simultaneously towards the article, to contact the article at a plurality of points around the irregular periphery thereof, at the same rate so that they simultaneously reach the desired positions of the portions of the edges of the article with which they contact, such surfaces being so shaped as substantially to conform to the contour of the portions of the edges of the article with which they contact, printing each article while so positioned, replacing the heated die with another for a different color in exactly the same position, again positioning and printing the succession of articles as before, and continuing the process with further heated dies for further colors as necessary.

RENE P. PIPEROUX.